(12) United States Patent
Patil et al.

(10) Patent No.: US 10,833,950 B2
(45) Date of Patent: Nov. 10, 2020

(54) SYSTEM AND METHOD FOR ANALYSIS OF INFORMATION TECHNOLOGY PRODUCTION SERVICE SUPPORT METRICS

(71) Applicant: TATA CONSULTANCY SERVICES LIMITED, Mumbai (IN)

(72) Inventors: Rutuja Maruti Patil, Pune (IN); Abhinay Puvvala, Pune (IN); Veerendra Kumar Rai, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 220 days.

(21) Appl. No.: 15/361,127

(22) Filed: Nov. 25, 2016

(65) Prior Publication Data

US 2017/0149621 A1 May 25, 2017

(30) Foreign Application Priority Data

Nov. 24, 2015 (IN) .......................... 4409/MUM/2015

(51) Int. Cl.
*H04L 12/24* (2006.01)
(52) U.S. Cl.
CPC .......... *H04L 41/14* (2013.01); *H04L 41/5074* (2013.01)
(58) Field of Classification Search
None
See application file for complete search history.

(56) References Cited

U.S. PATENT DOCUMENTS

| | | | |
|---|---|---|---|
| 6,643,613 B2 | 11/2003 | McGee et al. | |
| 7,181,374 B1 * | 2/2007 | Mosterman | G05B 23/021 700/1 |
| 7,444,263 B2 | 10/2008 | White et al. | |
| 2004/0243461 A1 * | 12/2004 | Riggle | G06Q 10/10 703/2 |
| 2010/0330079 A1 * | 12/2010 | Ruegg | C12Q 1/6886 424/133.1 |
| 2012/0116850 A1 * | 5/2012 | Abe | G06Q 10/0639 705/7.38 |
| 2014/0297373 A1 * | 10/2014 | Akkiraju | G06Q 10/06 705/7.41 |

FOREIGN PATENT DOCUMENTS

JP 2013-130946 7/2013

OTHER PUBLICATIONS

Wang et al. "The Data Processing Based on Factor Analysis", IEEE, pp. 823-826 (Year: 2011).*

* cited by examiner

*Primary Examiner* — Viet D Vu
*Assistant Examiner* — Mohammad Yousuf A. Mian
(74) *Attorney, Agent, or Firm* — Finnegan, Henderson, Farabow, Garrett & Dunner, LLP

(57) ABSTRACT

The disclosure relates generally to information technology (IT) production service support metrics and, more particularly, to analysis of the IT production service support metrics. The method includes receiving a plurality of metrics of an IT service management system and obtaining a causal loop diagram for the IT service management system. Subsequently, determining one or more deviant metrics from the plurality of metrics and obtaining associated CLD variable. Further, determining first set of metrics that affect the deviant metric and second set of metrics that may get affected. Subsequently, iteratively performing factor analysis on first set of metrics and second set of metrics to determine cogent factor for the deviation in the deviant metrics.

13 Claims, 4 Drawing Sheets

SYSTEM AND METHOD FOR ANALYSIS OF INFORMATION TECHNOLOGY PRODUCTION SERVICE SUPPORT METRICS

PRIORITY

This U.S. patent application claims priority under 35 U.S.C. § 119 to: India Application No. 4409/MUM/2015, filed on Nov. 24, 2015. The entire contents of the aforementioned application are incorporated herein by reference.

TECHNICAL FIELD

The disclosure herein relates generally to information technology (IT) production service support metrics and, more particularly, to analysis of the IT production service support metrics.

BACKGROUND

Generally, in an IT production and service organization, there are a plurality of processes for production services involved. The processes include metrics that are used to measure various aspects of the organization. Due to the sheer size and complexity of IT production service, the number of metrics needed to monitor is large. For example, various existing tools compute and provide a dashboard of metrics. The existing tools segregate the metrics and treat the metrics independently as belonging to various processes in the IT production service support.

The inventors here have recognized several technical problems with such conventional systems, as explained below. The existing tools may not consider the relationship between the metrics belonging to different processes at any point of time. The existing tools then provide a dashboard to a user which indicates when a metric is in deviant compared to tolerance levels. However, existing tools may not be able to analyze the metric for causes of the deviation as the relationship between the metrics beyond processes is not considered.

SUMMARY

Embodiments of the present disclosure present technological improvements as solutions to one or more of the above-mentioned technical problems recognized by the inventors in conventional systems. For example, in one embodiment, a method for analysis of information technology production service support metrics is disclosed. The method includes receiving a plurality of metrics from an IT service management system. Further a causal loop diagram comprising of one or more CLD variables depicting the IT service management system is obtained. Furthermore, one or more deviant metrics from the plurality of metrics are determined and an associated CLD variable is traced from the causal loop diagram. Subsequently, for the associated CLD a first set of metrics that caused deviation and a second set of metrics that may be impacted are determined. Subsequently, iteratively performing factor analysis is performed on the obtained first set of metrics and the second set of metrics to determine the cogent factors that cause deviation in the deviant metrics.

In another embodiment, a system analysis of information technology production service support metrics is disclosed. The system includes at least one processor, and a memory communicatively coupled to the at least one processor, wherein the memory comprises of several modules. The modules include analysis module that analyses metrics to determine the cogent factor that caused deviation in the deviant metric. The module receives a plurality of metrics from an IT service management system. Further a causal loop diagram comprising of one or more CLD variables depicting the IT service management system is obtained. Furthermore, one or more deviant metrics from the plurality of metrics are obtained and an associated CLD variable is traced from the causal loop diagram. Subsequently, for the associated CLD a first set of metrics that caused deviation and a second set of metrics that may be impacted are determined. Subsequently, iteratively performing factor analysis is performed on the obtained first set of metrics and the second set of metrics to determine the cogent factors that cause deviation in the deviant metrics.

In yet another embodiment, a non-transitory computer readable medium embodying a program executable in a computing device for analysis of information technology in a computing device for analysis of information technology production service support metrics is disclosed. The one or more instructions which when executed by one or more hardware processors causes receiving a plurality of metrics from an associated IT service management system. Further a causal loop diagram comprising of a plurality of CLD variables that depicts the IT service management system is obtained. Subsequently, one or more deviant metrics are determined from the plurality of metrics and an associated CLD variable is traced. Further, one or more deviant metrics are determines from the plurality of metrics and an associated CLD variable from the causal loop diagram is determined. Subsequently, a first set of metrics that caused deviation and second set of metrics that are to be impacted are determined for the associated CLD variable. Further, factor analysis is performed iteratively on the first set of metrics and the second set of metrics to determine cogent factors for quantifying deviation of the deviant metrics.

It is to be understood that both the foregoing general description and the following detailed description are explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In the present disclosure, information technology (IT) production service support metrics are analyzed. The IT production services are utilized by an enterprise for the functioning of enterprise's business. The IT production services that are utilized by the enterprise for the functioning of enterprise's business are supported by IT infrastructure management and IT service management system. Therefore, IT production service metrics are utilized to monitor and control the IT service management system. The present disclosure receives a plurality of metrics of the IT service management system. The IT service management system utilizes a systematic view to analyze metrics by designing a causal loop diagram that represents the IT service management system. The CLD consists of one or more CLD variables that are mapped to metrics of the ITSM system. Subsequently, deviant metrics are determined and associated CLD variable of the deviant metric is determined. Subsequently, a first set of metrics for CLD variable are determined that caused deviation and a second set of metrics that are to be impacting deviation in the deviant metrics. Further, iterative factor analysis is performed on the first set of metrics and second set of metrics to determine one or more factors that impact the metrics of the IT service management system. Furthermore, the factors that affect the maximum variability of the deviation of the deviant metrics are identified. The inter and intra relationships between the metrics are depicted by mapping metrics to the CLD variables and each CLD variable is defined by a set of metrics.

Figure 1:
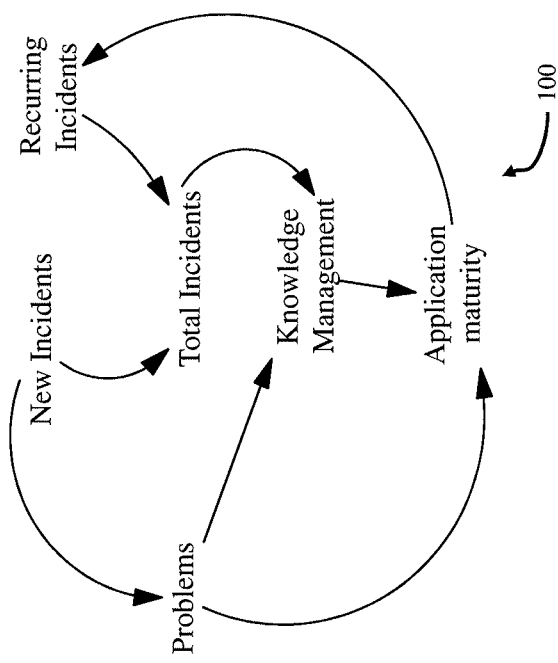
FIG. 1 is a causal loop diagram (CLD) of an IT service management system, according to some embodiments of the present disclosure.

FIG. 1 is an example of a causal loop diagram of an IT service management system, according to an embodiment of a present subject matter. For example, each element of the CLD 200 may be expressed in terms of associated constituent metrics as shown below.

CLD Element=$f(m1,m2 \ldots mn)$ where m1, 2 . . . mn are the metrics explaining a CLD element In the example shown in FIG. 1, the elements of the CLD include knowledge management, problems, total incidents, new incidents, recurring incidents and application maturity. A set of metrics that correspond to each of the above mentioned elements in the CLD are mapped. In this example, the metrics that explain knowledge management element of the CLD are related to the metrics that explain elements, such as problems and total incidents due to the connections into knowledge management. For example, the metrics related to problems include a number of problems resolved, average problem resolution time, a number of problems reopened and so on.

Figure 2:
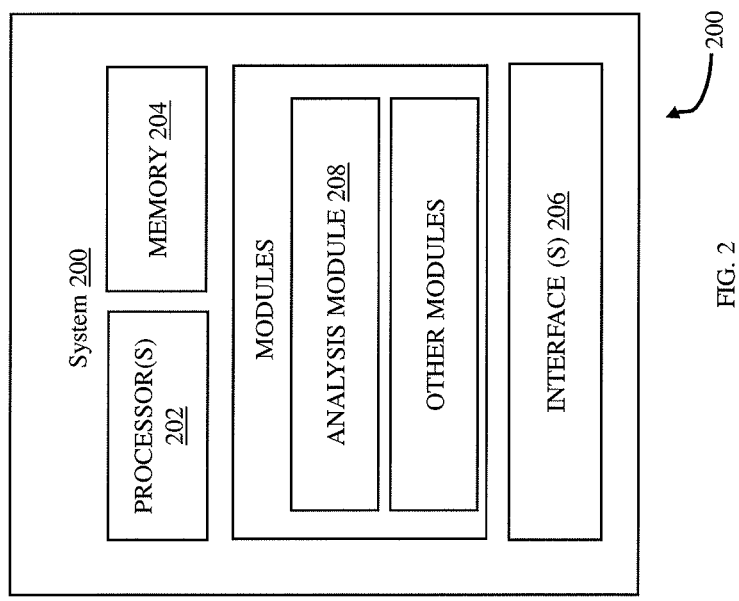
FIG. 2 illustrates a system for analysis of IT production service support metrics, according to some embodiments of the present disclosure.

FIG. 2 illustrates a system 200 for analysis of IT production service support metrics, according to an embodiment of a present subject matter. As shown in FIG. 2, the system 200 includes one or more processor(s) 202 and a memory 204 communicatively coupled to each other. The system 200 also includes interface(s) 206. Further, the memory 204 includes modules, such as an analysis module 208 and other modules.

Although FIG. 2 shows example components of the system 200, in other implementations, the system 200 may contain fewer components, additional components, different components, or differently arranged components than depicted in FIG. 2.

The processor(s) 202 and the memory 204 may be communicatively coupled by a system bus. The processor(s) 202 may include circuitry implementing, among others, audio and logic functions associated with the communication. The processor(s) 202 may include, among other things, a clock, an arithmetic logic unit (ALU) and logic gates configured to support operation of the processor(s) 202. The processor(s) 202 can be a single processing unit or a number of units, all of which include multiple computing units. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor (s) 202 is configured to fetch and execute computer-readable instructions and data stored in the memory 204.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 206 may include a variety of software and hardware interfaces, for example, interfaces for peripheral device(s), such as a keyboard, a mouse, an external memory, and a printer. The interface(s) 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 206 may include one or more ports for connecting the system 200 to other devices.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 204, may store any number of pieces of information, and data, used by the system 200 to implement the functions of the system 200. The memory 204 may be configured to store information, data, applications, instructions or the like for enabling the system 300 to carry out various functions in accordance with various example embodiments. Additionally or alternatively, the memory 204 may be configured to store instructions which when executed by the processor(s) 202 causes the system 200 to behave in a manner as described in various embodiments. The memory 204 includes the analysis module 208 and other modules. The module 208 includes routines, programs, objects, components, data structures, etc., which perform particular tasks or implement particular abstract data types. The other modules may include programs or coded instructions that supplement applications and functions of the system 200.

In an embodiment, the analysis module 208 performs analysis of IT production service support metrics of an IT service management system. In this embodiment, the analysis module 208 provide a systemic view to analyze metrics by designing a CLD that represents the IT service management system. The analysis module 208 then maps the metrics to CLD variables. The analysis module 208 uses the CLD to define inter-intra relationship between the metrics that belongs to different processes of the IT service management system. Further, the analysis module 208 determines a root cause of any possible deviations of the metrics from tolerance levels to enable proactive steps for controlling and negating the deviations. This is explained in more detail in the following description.

In an embodiment, the analysis module 208 analyses the IT production service support metrics by analyzing the deviant metrics. The module 208 receives a plurality of metrics associated with the IT service management system. Each of the plurality of metrics in the IT service management system has a tolerance value. The analysis module 208 compares a monitored value of a metric with the tolerance value to determine the deviant metrics. In an embodiment, the module 208 determines associated CLD variable for each of the deviant metrics, by analyzing the causal loop diagram. Subsequently, the module determines two sets of metrics, a first set of metrics and a second set of metrics for the associated variable. The first set of metrics are the metrics that caused deviation in the deviant metrics and the second set of metrics are the metrics that are to be impacted due to the deviation. The first set of metrics that caused deviation in the deviant metrics are determined by obtaining the list of metrics that are connected to the associated CLD variable by inward links. Similarly, the second set of metrics are the metrics that are soon to get affected by the deviant metrics. The second set of metrics are determined by obtaining the list of metrics that are connected to the associated CLD variable by outward links.

However, in an embodiment, not all the metrics affect the deviant metric significantly. Therefore, the module 208 determines cogent factors from the first set of metrics and second set of metrics. The cogent factors are the factors that explain the maximum variability of the deviation of the deviant metric. The module 208 determines cogent factors by performing factor analysis iteratively on the first set of metrics and second set of metrics. The factor analysis is performed iteratively on the first set of metrics and second set of metrics to eliminate the metrics with variance less than a threshold. The iterative process of factor analysis on the first set of metrics comprises of considering the output from the first iteration as input to the second iteration of factor analysis. The factor analysis includes eliminating the variable that are loosely correlated outside the variable and highly correlated metrics within the variable. Further, the module 208 computes the correlation matrix by utilizing data streams of the plurality of the metrics. The examples of data streams are total number of events received for a metric, total number of events handled automatically. The loosely correlated metrics are eliminated and highly correlated metrics are considered for further computation. The highly correlated metrics measure an underlying variable known as factor. Each factor creates a dimension or a classification axis on which measurement variables are plotted. Coordinates of each measurement variable projections on classification axis gives the factor scores and factor loadings. The factor scores represent the coordinate values and the factor loadings give the correlation of the variable with the factor.

The first factor set of the metrics of the selected CLD variable include the list of metrics of the CLD variables that are connected to the selected CLD variable by traversing to the selecting CLD variable. Multidimensional axis for each of the first set of metrics is determined and subsequently multidimensional space is created. Subsequently, factor score and factor loading is determined by projecting deviant metric on the multidimensional space.

Subsequently, the second factor set of the metrics comprises of the deviant metrics. The factor analysis on the second set of metrics is performed individually for every iteration. Subsequently, measurement variable list is built based on outward traversals of the causal loop diagram from the CLD variables connected to the deviant metric. Subsequently, multidimensional axis for each of the deviant metrics are determined and multidimensional space is created. Subsequently, factor score and factor loading is determined by projecting the measurement variable list built from the outward traversals. The factor loadings obtained are utilized to determine the factors and therefore factor loadings explain the amount of variance accounted by a particular CLD variable. Subsequently, the deviation of the deviant metrics can be quantified from the analysis performed on the metrics of the IT service management system.

In an embodiment, an example for analysis of metrics in an IT service management system is disclosed. In an example embodiment, the four processes considered are event management, incident management, problem management and change management. A causal loop diagram is created by communicating and collaborating different processes in the IT service management system.

Figure 3:
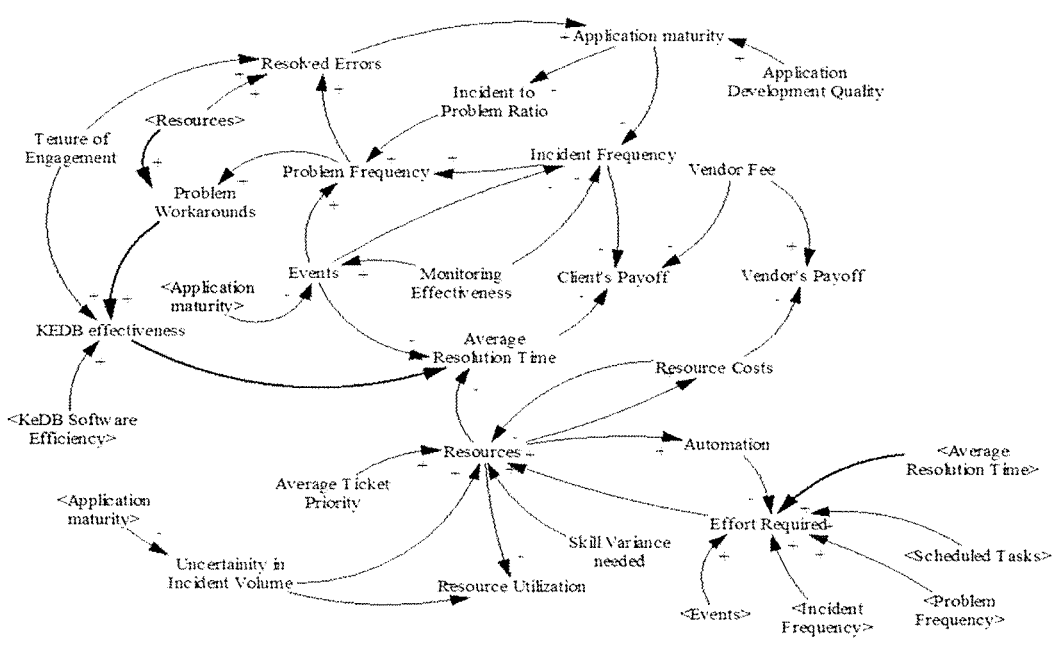
FIG. 3 is another causal loop diagram of an IT service management system with processes event management, incident management, problem management and change management, according to some embodiments of the present disclosure.

FIG. 3 is another example of causal loop diagram of an IT service management system with processes event management, incident management, problem management and change management, according to an embodiment of a present subject matter. Table 1 gives the deviant metrics associated with the CLD variable the tolerance limit of the deviant metric and the monitored value.

| Metric | Tolerance Limit | Monitored Value |
| --- | --- | --- |
| Average Resource Utilization (%) | 60 | 55 |
| Average cost to solve a Problem ($) | 500 | 540 |

By traversing the inward causal chain linkages of 'Average Resource Utilization' and 'Average Cost to Solve a Problem', a list of metrics that could account for the deviation are obtained. The data streams of various metrics during the period are utilized to conduct factor analysis. After eliminating the metrics based on individual variance thresholds, 'Resolution Time', 'Inter Arrival Time between Incidents' and 'Resolved Incidents per Resource' explain over 80% of the variance in Average Resource Utilization. Similarly, 'Average Cost to Solve a Problem' is explained by the metrics—'Problem Closure Time', 'RFCs Raised' and 'Problems Resolved'.

Therefore, 'Resolution Time', 'Inter Arrival Time between Incidents' and 'Resolved Incidents per Resource' are the metrics that are causing significant deviation to the "Average resource utilization". Similarly, 'Average Cost to Solve a Problem' is explained by the metrics—'Problem Closure Time', 'RFCs Raised' and 'Problems Resolved' are the metrics that are causing the significant deviation to 'Average Cost to Solve a Problem'.

Figure 4:
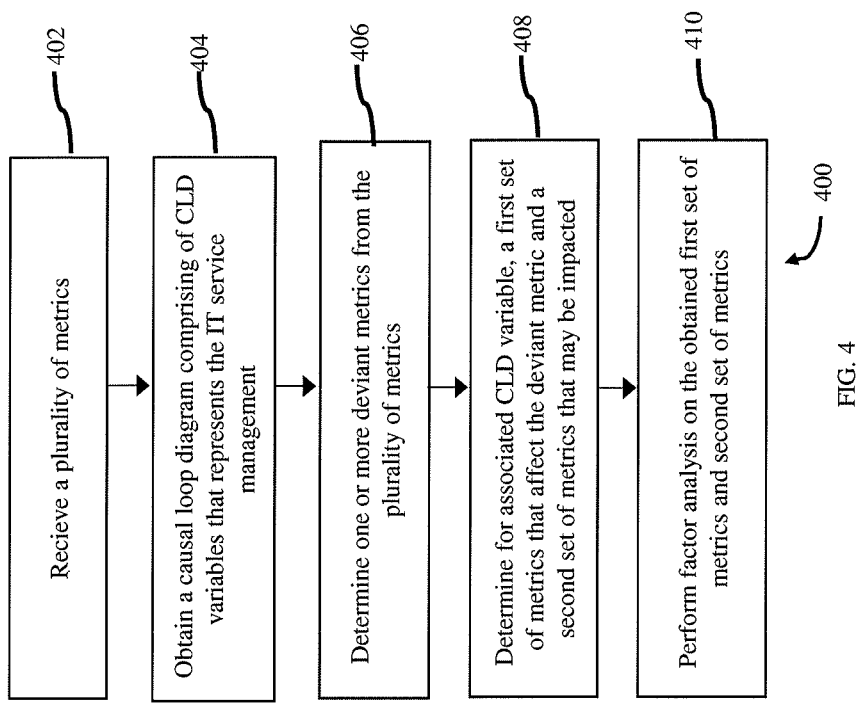
FIG. 4 is a flowchart illustrating a method for analysis of IT production service support metrics, according to some embodiments of the present disclosure.

FIG. 4 is a flowchart illustrating a method for analysis of IT production service support metrics, according to an embodiment of a present subject matter. At block 402, a plurality of metrics associated with IT service management system are received. At block 404, a causal loop diagram comprising of CLD variables that represents IT service management system is obtained. At block 406, one or more deviant metrics are determined from the plurality of metrics. At block 408, associated CLD variable for the deviant metric is determined and a first set of metrics that affect the deviant metric and a second set of metrics that may get affected due to the deviant metric are determined, at block 410, factor analysis is performed on first set of metrics and second set of metrics to determine variance of the deviant metric in the IT service management system.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant arts based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for analysis of Information Technology (IT) performance service support metrics, comprising:

receiving a plurality of metrics from an associated IT service management system;

providing a systematic view to analyze the plurality of metrics by designing a causal loop diagram (CLD) that represents the IT service management system and includes a plurality of CLD variables mapped to metrics of IT service management system, wherein the CLD variables include knowledge management, problems, total incidents, new incidents, recurring incidents, and application maturity, wherein the metric that explain the knowledge management are related to the metrics that explain the problems and the total incidents due to connection into the knowledge management, wherein the metrics related to the problems include a number of problems resolved, average problem resolution time, and a number of problems reopened;

obtaining the CLD comprising of the plurality of CLD variables to define inter-intra relationship between the plurality of metrics associated with processes of the IT service management system, wherein each metric is connected to the one or more CLD variables;

determining a root cause of deviations of the plurality of metrics from a tolerance value to enable proactive steps for controlling and negating the deviations;

determining one or more deviant metrics by comparing a monitored value of a metric with the tolerance value and tracing an associated CLD variables from the causal loop diagram;

determining, for the associated CLD variables, a first set of metrics from the plurality of metrics, that caused deviation in the deviant metrics and determining for the associated CLD variables, a second set of metrics from the plurality of metrics that are to be impacted due to the deviation in the deviant metrics;

iteratively performing factor analysis on the first set of metrics and the second set of metrics to determine cogent factors for quantifying deviation of the deviant metrics, wherein iteratively performing factor analysis comprises eliminating one or more of the plurality of metrics with a variance less than threshold, thereby eliminating loosely correlated metrics and maintaining highly correlated metrics, wherein each cogent factor creates a classification axis on which measurement variables are plotted, and coordinates of each measurement variable projections on the classification axis provides a factor score and a factor loading, wherein the factor score represent a coordinate value, and the factor loading provide correlation of the variable with the factor and an amount of variance accounted by the variable, wherein a first multidimensional space is created for each of the first set of metrics and the factor score, factor loading are determined by projecting the deviant metric on the first multidimensional space, wherein a second multidimensional space is created for each of the second set of metrics and the factor score, factor loading are determined by projecting a measurement variable list built based on outward traversals of the CLD from CLD variables connected to the deviant metric.

2. The method of claim 1, wherein the cogent factors are the factors that affect maximum variability of the deviation of the deviant metrics.

3. The method of claim 1, wherein eliminating the one or more of the plurality of metrics comprises of computing a correlation matrix by utilizing a total number of events received for a metric, and a total number of events handled automatically.

4. The method of claim 3, further comprising of determining the variance of each of the plurality of metrics based on the factor loading of the cogent factors obtained from computing the correlation matrix.

5. The method of claim 1, wherein the first set of metrics are determined by obtaining the metrics that are connected to the associated CLD variable by inward links, and wherein the second set of metrics are determined by obtaining the metrics that are connected to the associated CLD variable by outward links.

6. The method of claim 1, wherein the factor analysis on the first set of metrics comprises considering an output from a first iteration as an input to a second iteration of the factor analysis, and wherein the factor analysis includes eliminating the variable that are loosely correlated outside the variable and maintaining highly correlated metrics within the variable.

7. A system for analysis of Information technology (IT) production service support metrics, the system comprising of:

at least one processor; and
a memory communicatively coupled to the at least one processor, wherein the memory comprises an analysis module to:
receive a plurality of metrics from an associated IT service management system;
provide a systematic view to analyze the plurality of metrics by designing a causal loop diagram (CLD) that represents the IT service management system and includes a plurality of CLD variables mapped to metrics of IT service management system, wherein the CLD variables include knowledge management, problems, total incidents, new incidents, recurring incidents, and application maturity, wherein the metric that explain the knowledge management are related to the metrics that explain the problems and the total incidents due to connection into the knowledge management, wherein the metrics related to the problems include a number of problems resolved, average problem resolution time, and a number of problems reopened;
obtain the CLD comprising of the plurality of CLD variables to define inter-intra relationship between the plurality of metrics associated with processes of the IT service management system; wherein each metric is connected to the one or more CLD variables;
determine a root cause of deviations of the plurality of metrics from a tolerance value to enable proactive steps for controlling and negating the deviations;
determine one or more deviant metrics by comparing a monitored value of a metric with the tolerance value and tracing an associated CLD variable from the causal loop diagram;
determine for the associated CLD variable a first set of metrics from the plurality of metrics, that caused deviation in the deviant metrics and determining for the associated CLD variable, a second set of metrics from the plurality of metrics that are to be impacted due to the deviation in the deviant metrics;
iteratively perform factor analysis on the first set of metrics and the second set of metrics to determine cogent factors for quantifying deviation of the deviant metrics wherein iteratively performing factor analysis comprises eliminating the one or more of the plurality of metrics with a variance less than threshold, thereby eliminating loosely correlated metrics and maintaining highly correlated metrics, wherein each cogent factor creates a classification axis on which measurement variables are plotted, and coordinates of each measurement variable projections on the classification axis provides a factor score and a factor loading, wherein the factor score represent a coordinate value, and the factor loading provide correlation of the variable with the factor and an amount of variance accounted by the variable, wherein a first multidimensional space is created for each of the first set of metrics and the factor score, factor loading are determined by projecting the deviant metric on the first multidimensional space, wherein a second multidimensional space is created for each of the second set of metrics and the factor score, factor loading are determined by projecting a measurement variable list built based on outward traversals of the CLD from CLD variables connected to the deviant metric.

8. The system of claim 7, wherein the cogent factors are the factors that affect the maximum variability of the deviation of the deviant metrics.

9. The system of claim 7, wherein eliminating the one or more of the plurality of metrics comprises computing a correlation matrix by utilizing a total number of events received for a metric, and a total number of events handled automatically.

10. The system of claim 9, further comprising of determining the variance of each of the plurality of metrics based on the factor loading of the cogent factors obtained from computing the correlation matrix.

11. The system of claim 7, wherein the first set of metrics are determined by obtaining the metrics that are connected to the associated CLD variable by inward links, and wherein the second set of metrics are determined by obtaining the metrics that are connected to the associated CLD variable by outward links.

12. The system of claim 7, wherein the factor analysis on the first set of metrics comprises considering an output from a first iteration as an input to a second iteration of the factor analysis, and wherein the factor analysis includes eliminating the variable that are loosely correlated outside the variable and maintaining highly correlated metrics within the variable.

13. A non-transitory computer readable medium embodying a program executable in a computing device for analysis of Information technology (IT) production service support metrics, the program comprising:

a program code for receiving a plurality of metrics from an associated IT service management system;

a program code for providing a systematic view to analyze the plurality of metrics by designing a causal loop diagram (CLD) that represents the IT service management system and includes a plurality of CLD variables mapped to metrics of IT service management system wherein the CLD variables include knowledge management, problems, total incidents, new incidents, recurring incidents, and application maturity, wherein the metric that explain the knowledge management are related to the metrics that explain the problems and the total incidents due to connection into the knowledge management, wherein the metrics related to the problems include a number of problems resolved, average problem resolution time, and a number of problems reopened;

a program code for obtaining CLD comprising of the plurality of CLD variables to define inter-intra relationship between the plurality of metrics associated with processes of the IT service management system, wherein each metric is connected to the one or more CLD variables;

a program code for determining a root cause of deviations of the plurality of metrics from a tolerance value to enable proactive steps for controlling and negating the deviations;

a program code for determining one or more deviant metrics by comparing a monitored value of a metric with the tolerance value and tracing an associated CLD variables from the causal loop diagram;

a program code for determining, for the associated CLD variables, a first set of metrics from the plurality of metrics, that caused deviation in the deviant metrics and determining for the associated CLD variables, a second set of metrics from the plurality of metrics that are to be impacted due to the deviation in the deviant metrics;

a program code for iteratively performing factor analysis on the first set of metrics and the second set of metrics to determine cogent factors for quantifying deviation of the deviant metrics, wherein iteratively performing factor analysis comprises eliminating one or more of the plurality of metrics with a variance less than threshold, thereby eliminating loosely correlated metrics and maintaining highly correlated metrics, wherein each cogent factor creates a classification axis on which measurement variables are plotted, and coordinates of each measurement variable projections on the classification axis provides a factor score and a factor loading, wherein the factor score represent a coordinate value, and the factor loading provide correlation of the variable with the factor and an amount of variance accounted by the variable, wherein a first multidimensional space is created for each of the first set of metrics and the factor score, factor loading are determined by projecting the deviant metric on the first multidimensional space, wherein a second multidimensional space is created for each of the second set of metrics and the factor score, factor loading are determined by projecting a measurement variable list built based on outward traversals of the CLD from CLD variables connected to the deviant metric.

* * * * *